June 28, 1966  IWAO KAWAKAMI  3,258,466
1-HYDROXYETHYL-4,5-DIPHENYLIMIDAZOLE
Filed Dec. 6, 1962  3 Sheets-Sheet 1

INVENTOR.
IWAO KAWAKAMI
BY
AGENT

June 28, 1966  IWAO KAWAKAMI  3,258,466
1-HYDROXYETHYL-4,5-DIPHENYLIMIDAZOLE
Filed Dec. 6, 1962  3 Sheets-Sheet 3

INVENTOR.
IWAO KAWAKAMI
BY
AGENT

stated above, there may be errors; proceeding with best reading.

United States Patent Office 3,258,466
Patented June 28, 1966

3,258,466
1-HYDROXYETHYL-4,5-DIPHENYLIMIDAZOLE
Iwao Kawakami, 28—8 1-chome, Inokashira
Mitaka-shi, Tokyo, Japan
Filed Dec. 6, 1962, Ser. No. 242,717
1 Claim. (Cl. 260—309)

This invention relates to 1-hydroxyethyl-4,5-diphenylimidazole and method of manufacture thereof. This new material when dissolved in a suitable ointment base or solvent and applied to human skin causes proper alternate dilation and contraction of the peripheral blood vessels and improves circulation of blood and lymph.

Moreover, the high solubility of this new substance in dilute solvents aids in mixing it in an ointment base so as to be readily absorbed into the skin in the desired quantity.

An object of this invention is the production of the new compound having the noted desirable properties.

A further object of this invention is the synthesis of this new compound from 4,5-diphenylimidazole.

Another object of this invention is a novel method of synthesizing 1-hydroxyethyl-4,5-diphenylimidazole from 4,5-diphenylimidazole.

An additional object of this invention is the preparation of a cosmetic substance or ointment containing the novel compound herein described.

The above and other objects will be apparent from a consideration of the accompanying drawings taken with the following specification, which together form a complete disclosure of my invention.

Figure 1:
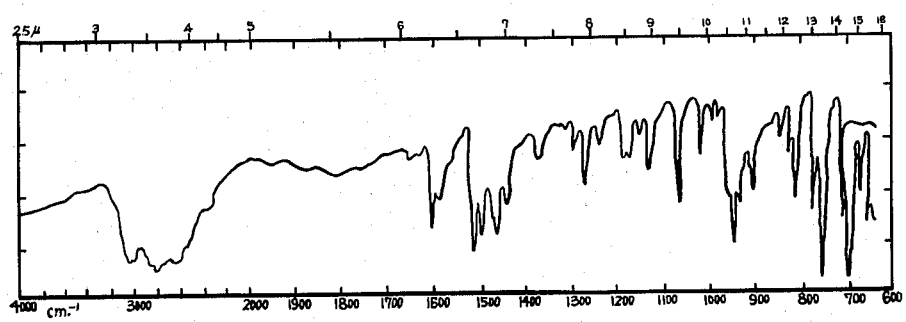
Figure 2:
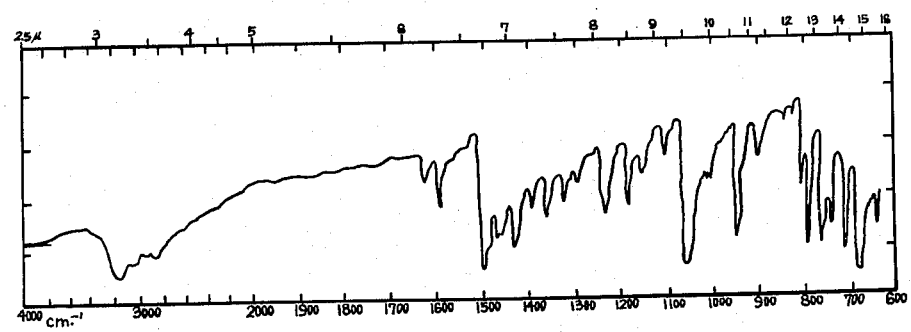
Figure 3A:
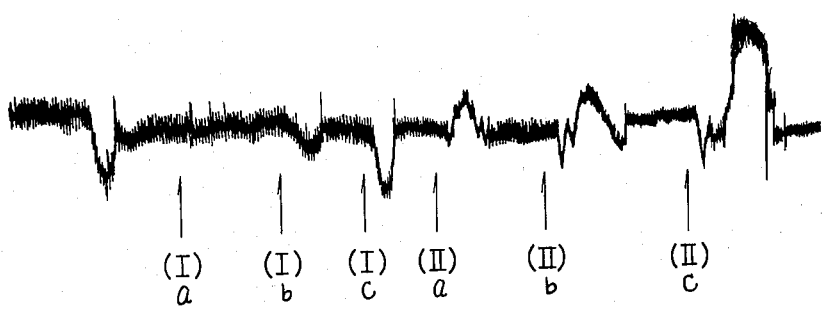
Figure 3B:
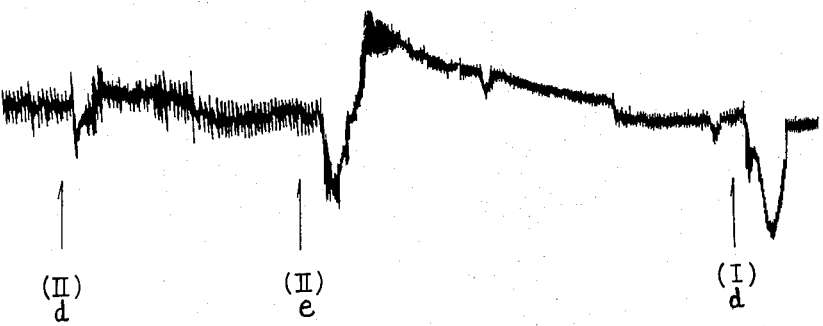
Figure 4:
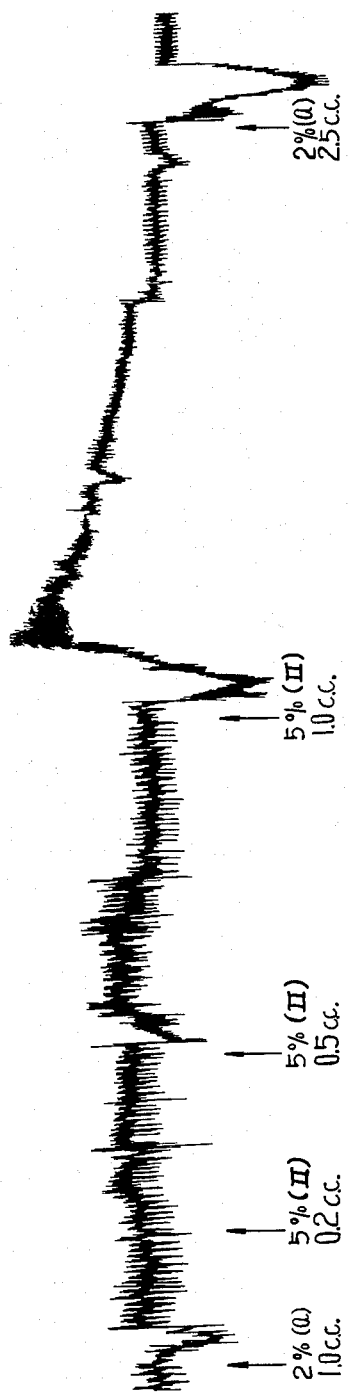
Figure 5:
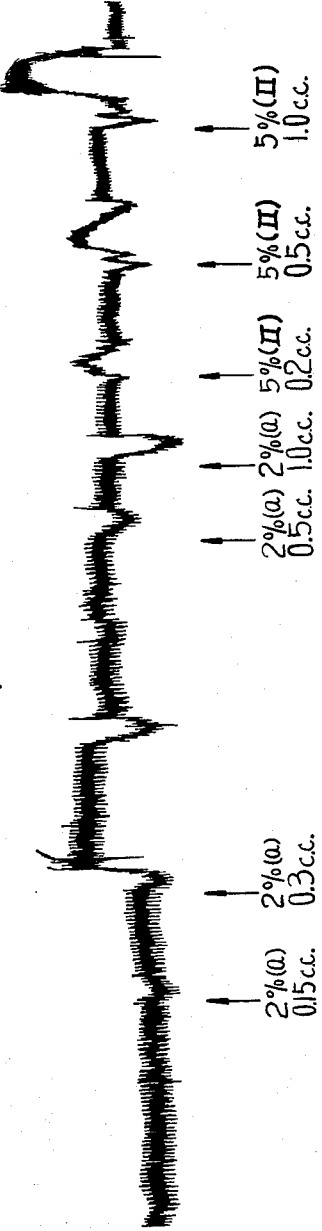

In the drawings:
FIG. 1 is a graph showing the absorption in the infrared spectrum of 4,5-diphenylimidazole;
FIG. 2 is a graph showing the absorption in the infrared spectrum of 1-hydroxyethyl-4,5-diphenylimidazole;
FIGS. 3A and 3B are graphs from photographs of a kymographic chart taken as later to be described, and
FIGS. 4 and 5 are drawings made from a kymographic chart as in FIGS. 3A and 3B, showing at (a) the results with a control substance and at (II) the results with different noted dosages and concentrations of the product of this invention.

Hereinafter, 4,5-diphenylimidazole will be denoted (I) and the new product, 1-hydroxyethyl-4,5-diphenylimidazole will be denoted (II).

The structural formulae follow:

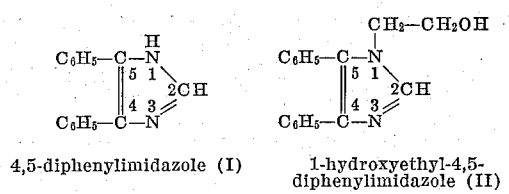

4,5-diphenylimidazole (I)    1-hydroxyethyl-4,5-diphenylimidazole (II)

The following is an elementary analysis of 1-hydroxyethyl-4,5-diphenylimidazole:

|                 | Calculated | Experimental |
|-----------------|------------|--------------|
| C, percent      | 77.25      | 77.03        |
| H, percent      | 6.1        | 5.90         |
| N, percent      | 10.6       | 10.27        |

The physical constants are as follows:

PHYSICAL CONSTANTS

| Substance | (I) | (II) |
|---|---|---|
| Melting Points | 232–235° C | 162–164° C. |
| $\lambda_{Max.}^{CH_3OH}$ | 282 mμ | 255 mμ. |
| $E_{1\,cm.}^{1\%}$ | 532 | 487. |

$\lambda_{Max.}^{CH_3OH}$ relates to the maximum absorption of U.V. rays when the substance is dissolved in methyl alcohol.

$E_{1\,cm.}^{1\%}$ relates to the extinction coefficient of the substance in a 1% alcohol solution measured by Beckman's quartz spectrophotometer.

In FIGS. 1 and 2 they are shown as follows:
FIGURE 1 shows the absorption of the infra-red spectrum of 1.5 mg. of (I) with melting point of 232–235° C. with 170 mg. of potassium bromide added, in tablet form.

FIGURE 2 shows the absorption of the infra-red spectrum of 1.7 mg. of (II), melting points 162–164° C., with 170 mg. of potassium bromide added, in tablet form. Here the absorptions of the NH radical at 2600–2800 cm.$^{-1}$ and 1587 cm.$^{-1}$ disappear so that in these positions a different phenomenon is observed. Namely there are remarkable absorptions of the OH radical at 3190 cm.$^{-1}$ and 1063 cm.$^{-1}$.

Both figures show the absorptions of the $C_6H_5$ radical at 1600 cm.$^{-1}$, 1505 cm.$^{-1}$, 1440 cm.$^{-1}$, and 693 cm.$^{-1}$; also the imidazole ring absorptions at 1478 cm.$^{-1}$ and 1468 cm.$^{-1}$.

To show that in (II) the —$CH_2$—$CH_2OH$ radical is attached in the 1-position, a portion is dissolved in liquid ammonia with metallic sodium added. The result is shown as follows:

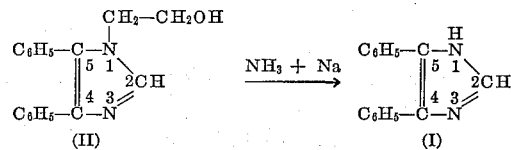

The solubility of the compounds in dilute alcohol is according to the following table:

[Solubility in 60% alchool at 20° C.]

| (I) | (II) |
|---|---|
| 4.4 mg./ml. | 42 mg./ml. |

This indicates a solubility of (II) about 9.5 times greater than that of (I) in 60% alcohol.

The curves in FIGS. 3A and 3B were taken, photographically, from a kymograph recording showing the effects of various dosages of a 2% solution of (I) and a 5% solution of (II) in a 0.6% hydrochloric acid solution. Full grown dogs weighing from 10–15 kg. were deeply narcotized with phenobarbital after which various quantities of the mentioned solutions were injected into the femoral veins. In FIGS. 3A and 3B, at ($I_a$), ($I_b$), ($I_c$)

and ($I_d$) are shown the results of injecting, respectively 0.2 cc., 0.5 cc., 1 cc. and 2.5 cc. of the solution of (I) as above explained. At ($II_a$), ($II_b$), ($II_c$), ($II_d$) and ($II_e$) are shown the results of injecting, respectively, of the 5% solution of (II), as above noted, in quantities of 0.2 cc., 0.5 cc., and 1 cc., and again 0.5 cc. and 1 cc. Solution of (I) dilates the blood vessels and lowers the blood pressure in the juglar vein. (II) dilates the blood vessels in the same manner as soon as injected, but very soon it acts causing contraction and after repetition of alternate dilation and contraction the blood pressure becomes normal.

I shall now show the method of synthesis of (II). The process is similar to the synthesis of 1-benzyl-2-hydroxymethylimidazole, as shown in an article by Jones, in Jour. Amerc. Chem. Soc., page 383, vol. 71, 1949.

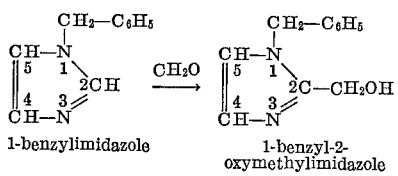

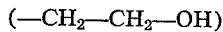
1-benzylimidazole    1-benzyl-2-oxymethylimidazole

Formaldehyde ($CH_2O$) attaches in position 2. No research is known to me wherein the side chain $$(-CH_2-CH_2-OH)$$

is placed in the 1-position in connection with 4,5-diphenylimidazole. I have obtained this result by two methods and placed the hydroxyethyl radical in the 1-position as in the following Examples A and B:

(A) 4,5-diphenylimidazole is dissolved in ethyl alcohol, methyl alcohol or methylated spirit. The solution is brought gradually to the boiling point and ethylene chlorhydrin and caustic alkali equivalent to the ethylene chlorhydrin are added. The mixture is stirred thoroughly and the reaction results as follows:

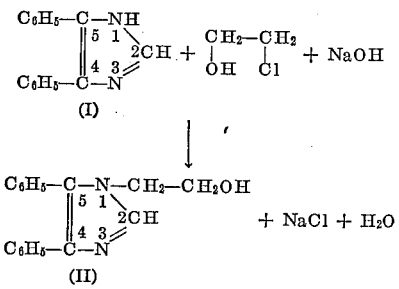

(B) 4,5-diphenylimidazole is dissolved in ethyl alcohol, methyl alcohol or methylated spirit. A small amount of piperidine or secondary amine

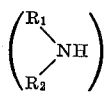

or pyridine or tertiary amine

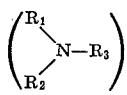

is added in the solution as a catalyzer. This solution is boiled and ethylene oxide

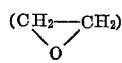

is passed into it, and the reaction is as follows:

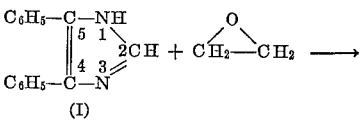

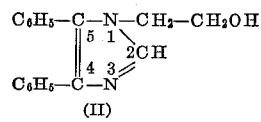

The resulting compound is previously unknown, that is a 4,5-diphenylimidazole having a hydroxyethyl ($-CH_2-CH_2OH$) radical in the 1-position. This newly synthesized compound is purified by chromatographic refining.

The following examples demonstrate suitable methods of obtaining the new product (II) in pure form.

EXAMPLE I

A reflux condenser and two dripping funnels are attached to a three-necked flask. 50 g. of 4,5-diphenylimidazole are dissolved in 400 ml. of methylated spirit with heat applied. At the same time a solution of 92 ml. ethylene-chlorhydrin (1.2 mol) and a solution of 48.4 g. (1.2 mol) caustic soda dissolved in 100 ml. of water are dripped from the two dripping funnels. The mixture is stirred until the dripping is complete. Then 60 ml. of water is added and the whole is refrigerated for a considerable period, such as overnight. The crystals are then filtered in a vacuum filter and 5 g. decolorizing charcoal is added to the filtrate. After filtering water is added until it becomes a turbid white, and the product is again refrigerated for a long period, such as overnight. Next the crystals are filtered and dried. This series of operations produces the crude 1-hydroxyethyl-4,5-diphenylimidazole. The yield of these crude crystals is about 75%. They have a melting point of 145–165° C. This crude substance is dissolved in benzene and purified by adding Brockmann's alumina (chromatograph). It is then filtered in vacuum and the filtrate evaporated, and recrystallized from 60% methanol. The pure compound (II) with a melting point of 162–164° C. results.

EXAMPLE II 22 g. of 4,5-diphenylimidazole is dissolved in 300 ml. of methanol and heated. 1 cc. of piperidine or diphenylamine or pyridine or triphenylamine is added and the temperature is held at 55–65° C. for three hours while ethylene oxide is passed continuously through the solution. After completion of this operation 300 ml. of water is added and the solution is refrigerated for a period, such as overnight. The product is next filtered in vacuum and, after washing and drying, crude 1-hydroxyethyl-4,5-diphenylimidazole is obtained in the amount of 21 g. This product has a melting point of 145–165° C. The crude product is refined in the same manner as set forth in Example I to obtain pure 1-hydroxyethyl-4,5-diphenylimidazole. The yield of the pure product is about 60%.

Many cosmetics or dermatological preparations sold on the market today contain substances which cause skin irritation or injury to some persons, especially those with unusually tender skins. Cosmetics which have caused injury or irritation to such persons, who are usually diathetic, have been applied to the skin of persons who have apparently recovered completely from allergic skin reactions. In most cases this caused a new eruption or other evidence of the allergic skin reaction, which seems to confirm the fact that skin irritations by cosmetics can be produced experimentally. Dermatologists have stated that skin injury caused by cosmetic products are a type of contact dermatitis. This is believed, now not to be entirely true, since the reactions are not the result of a single causative factor. Some of this contact dermatitis is rather difficult to treat at present. It should thus be quite difficult to manufacture irritation free cosmetics if the irritation is caused by cosmetics and the principal lesion is contact dermatitis. Recently, a group of dermatologists has concluded that the contact dermatitis has little relation to free histamine. Therefore, the addition of antihistamines to cosmetics has had little or no effect on skin sensitive persons. This has now been confirmed by research.

In an experiment with the excised living intestine of a guinea pig, which had been shrunk beforehand by the application of $1/100\%$ histamine solution, it was shown that the possibility of reducing skin irritation is decreased percentage-wise when the new cosmetics were used. They were applied to patients who had recovered from allergic skin reactions. In these cases, an emulsifying agent, as a polyoxyethylenelauryl alcohol ether, was added to the cosmetics instead of using antihistamine drugs. The addition of such antihistamine drugs as Benadryl or such preparations as corticosteroid hormones does not effect a reduction of the skin irritation or contact dermatitis, but the new cosmetics containing a polyoxyethylene lauryl alcohol ether did show a weak activity reaction or beneficial results on the contact dermatitis.

The addition of substances to cosmetics should enable them to act as though containing an antihistamine. It should further render them stable or resistant to changes in quality. When antihistamine drugs of the salt type, such as the hydrochloric salts, are added to cosmetics, coloring is likely to take place. Consequently they are generally omitted. Further the addition of substances to cosmetics should not render them likely to cause contact dermatitis. The conditions above noted are important, and a great amount of research has been carried out in order to carry out such objects and conditions. A new chemical compound, 1-hydroxyethyl-4,5-diphenylimidazole, known herein as (II), has been found to be highly satisfactory. It shows a moderate antihistamine effect on an animal experiment, wherein the living intestine of a guinea pig was shrunk by 1 ml. of a $1/100\%$ water solution of histamine. The shrunk intestine was treated with 1 cc. of a 0.5% water solution of (II) and was found to relax and become longer. When applied as a treatment for skin ailments, an ointment was prepared from a hydrophilic petroleum jelly base containing 0.5% (II). In acute skin ailments, which are the result of free histamine etc., the treatment was effective in more than 90% of the trials. In chronic skin ailments when the effect of free histamine is not clearly apparent, the treatment is effective in 60% of the cases.

(II) has the remarkable effects as shown in FIGS. 3A and 3B. After injecting 1 cc. of a 5% water solution into the femoral vein of a mature dog, the total pressure in the jugular vein was measured with a mercury manometer. A drop in pressure is noted immediately, followed by a sharp rise. This is followed by a period of fluctuating reductions and rises in pressure of decreasing intensity until, after a few moments, normal steady pressure is noted. The graphs in FIGS. 4 and 5 are made from a kymograph record of these tests. As a control, 0.15 cc. of a 2% water solution of 4, 5-diphenylimidazole (I) was injected as above. The result is shown as ($a$) in both FIGS. 4 and 5 and references 1 cc., 2.5 cc., of a 2% solution in FIG. 5 and in each case is a pressure drop only. The record shows at other points, denoted (II), the effect of various dosages and various concentrations of (II). 0.2, 0.5 and 1.0 cc. of (II) in each figure.

The above noted fluctuations of pressure can be referred to as phenomena of the peripheral blood vessels, when exposed to the substances referred to as used in cosmetics or medicated ointments. The reduction in pressure corresponds to a dilating of the peripheral blood vessels and the rise in pressure corresponds to a contraction of the peripheral blood vessels. Thus, when a preparation containing 1-hydroxyethyl-4, 5-diphenylimidazole is applied there is a period of dilation and contraction of the peripheral blood vessels decreasing in intensity until normal pressure is attained. The living body does not either constantly dilate or contract the blood vessels. Therefore, if they are dilated excessively, automatically by reflex-action there is a contracting, seeking to attain the condition generally considered normal. Therefore it is clear that the application of (II) should be such that the skin and the peripheral blood vessels therein will retain the normal status. In the above experiment, wherein water solution of (II) was injected, the results are the same as those observed when a salve containing (II) is applied to the skin. Moreover, it has been confirmed that where cosmetics have caused injury or irritation, when such irritation has been cured, and an ointment containing (II) has been applied to the skin of allergic persons, little or no irritation was experienced. In experiments using 0.02% to 1.5% (II), it was confirmed that the substance (II) may be the crude preparation, before purification. Less than 0.02% seems to be relatively ineffective, while more than 1.5% may cause improper results.

In the following examples, representative of experimental batches of substances, the proportions are by weight, and show various preparations using (II).

I. Cold cream

| | Percent |
|---|---|
| Beeswax | 8.0 |
| Solid paraffin | 5.0 |
| Petroleum jelly | 15.0 |
| Fluid paraffin | 40.0 |
| Emulsifying agent | 6.0 |
| (II) | 0.08 |
| Perfume | 1.0 |
| Distilled water | 24.92 |

To this mixture a suitable amount of antiseptic substance may be added, if desired. To prepare; (1) mix beeswax, solid paraffin, petroleum jelly and fluid paraffin and heat the mixture and hold at 70° C.; (2) heat the distilled water to 70° C.; (3) mix (II), perfume and emulsifying agent and add to the batch of step (1); (4) pour the batches of steps (2), (3) together and mix in an emulsion mixer; (5) cool the batch of step (4) by stirring and pour into molds or containers to solidify.

II. Vanishing cream

| | Percent |
|---|---|
| Stearic acid | 15.0 |
| Glycerin monosterate | 5.0 |
| Cetyl alcohol | 4.0 |
| Emulsifying agent | 5.0 |
| (II) | 0.03 |
| Perfume | 1.0 |
| Propylene glycol | 15.0 |
| Potassium hydroxide | 0.2 |
| Distilled water | 54.77 |

To the above, suitable antiseptic substances may be added if desired, to prepare: (1) mix (II), emulsifying agent and perfume also half the propylene glycol and heat to dissolve; (2) mix distilled water, half the propylene glycol and potassium hydroxide and heat to 70° C.; (3) mix stearic acid, glycerin monosterate and cetyl alcohol and heat to melt and hold at 70° C.; (4) pour the batches of steps (1) and (3) together and mix thoroughly; (5) combine the batches of steps (2) and (4) and mix in an emulsion mixer; (6) cool the mixture and stir until it becomes creamy.

III. Face milk lotion

| | Percent |
|---|---|
| Fluid paraffin | 10.0 |
| Stearic acid | 2.0 |
| Emulsifying agent | 4.0 |
| Alcohol | 5.0 |
| (II) | 0.1 |
| Perfume | 1.0 |
| Distilled water | 77.9 |

A suitable amount of antiseptic substance may be added to the above, if desired. To prepare; (1) mix (II), perfume, emulsifying agent, stearic acid and fluid paraffin and heat to melt; hold at 65° C.; (2) mix distilled water and alcohol and heat to 65° C. and pour into batch of step (1) while stirring; (3) mix in an emulsifying mixer; (4) cool, while stirring, to 30° C.

IV. Face lotion

| | Percent |
|---|---|
| Carbowax (1500) | 5.0 |
| Propylene glycol | 10.0 |
| Alcohol | 15.0 |
| (II) | 0.04 |
| Perfume | 0.2 |
| Emulsifying agent | 1.0 |
| Distilled water | 68.76 |

A suitable amount of a harmless dye and an antiseptic agent may be added, if desired.

To prepare: (1) mix perfume, (II), emulsifying agent and half the alcohol and melt; (2) mix all other ingredients and add to the batch of step (1) and emulsify.

The products of Examples I to IV and similar products without (II) were tested on 10 skin sensitive women who at the time were free of any allergy reactions. For comparison, half the face was treated with the product containing (II) and the other half with the similar products without (II). The results are shown in the following table:

NUMBER OF SKIN IRRITATIONS AMONG 10 SUBJECTS

| Cosmetics | With (II) | Without (II) |
|---|---|---|
| Cold Cream | 1 | 10 |
| Vanishing Cream | 0 | 2 |
| Face Milk Lotion | 0 | 10 |
| Face Lotion | 0 | 5 |

The noted skin irritations included itchiness and eruptions.

Having now described my new compound and the method of obtaining it and the new product containing it, I desire it to be understood that modifications and changes may be made within the skill of the art and the scope of the appended claim.

I claim:

1-hydroxyethyl-4,5-diphenylimidazole according to the following structural formula:

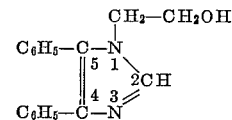

References Cited by the Examiner

UNITED STATES PATENTS

| | | | |
|---|---|---|---|
| 2,005,538 | 6/1935 | Engelmann | 260—309 |
| 2,015,179 | 9/1935 | McGraw | 167—91 |
| 2,333,093 | 11/1943 | Dearborn | 167—91 |
| 2,710,870 | 6/1955 | Lawson | 260—309 |
| 2,750,379 | 6/1956 | Hanslick | 260—309 X |
| 2,824,879 | 2/1958 | McKay et al. | 260—309.6 |
| 2,828,317 | 3/1958 | Siegrist et al. | 260—309.2 |

FOREIGN PATENTS 836,854  6/1960  Great Britain.

OTHER REFERENCES

Jefferson Chemical Company, A technical Bulletin on Ethylene Oxide, pages 16–17, Houston, Jefferson Chemical Company, 1956.

Sawlewicz et al.: Chemical Abstracts, vol. 54, pages 17381 (1960). (Abstract of Acta Palon. Pharm., vol. 17, pages 85–92, 1960.)

Tajima et al.: Chemical Abstracts, vol. 51, pages 16160-1 (1957).

WALTER A. MODANCE, *Primary Examiner.*

FRANK CACCIAPAGLIA, JR., *Examiner.*

A. P. FAGELSON, N. TROUSOF, *Assistant Examiners.*